(12) United States Patent
Arslan et al.

(10) Patent No.: US 8,634,359 B2
(45) Date of Patent: Jan. 21, 2014

(54) LOCATING ELECTROMAGNETIC SIGNAL SOURCES

(75) Inventors: Tughrul Sati Arslan, Edinburgh (GB); Zankar Upendrakumar Sevak, Edinburgh (GB); Firas Alsehly, Edinburgh (GB)

(73) Assignee: Sensewhere Limited, Edinburgh (GB)

( * ) Notice: Subject to any disclaimer, the term of this patent is extended or adjusted under 35 U.S.C. 154(b) by 343 days.

(21) Appl. No.: 12/806,213

(22) Filed: Dec. 23, 2009

(65) Prior Publication Data

US 2011/0170524 A1 Jul. 14, 2011

(51) Int. Cl.
*H04W 4/00* (2009.01)

(52) U.S. Cl.
USPC ........ 370/329; 370/338; 701/469; 455/404.2; 455/456.1

(58) Field of Classification Search
USPC ........ 370/328; 701/468, 469, 533; 455/404.2, 455/456.1; 342/357.48, 357.34; 340/539.13
See application file for complete search history.

(56) References Cited

U.S. PATENT DOCUMENTS

| | | | |
|---|---|---|---|
| 5,862,495 A * | 1/1999 | Small et al. ............... | 701/13 |
| 6,445,927 B1 | 9/2002 | King et al. | |
| 7,355,513 B1 * | 4/2008 | Brockel et al. ........... | 340/539.13 |
| 2003/0125046 A1 | 7/2003 | Riley et al. | |
| 2003/0143975 A1 * | 7/2003 | Hernandez et al. .......... | 455/404 |
| 2004/0203904 A1 * | 10/2004 | Gwon et al. ............... | 455/456.1 |
| 2005/0046608 A1 | 3/2005 | Schantz et al. | |
| 2005/0093745 A1 | 5/2005 | Krumm et al. | |
| 2005/0285793 A1 | 12/2005 | Sugar et al. | |
| 2005/0288033 A1 | 12/2005 | McNew et al. | |
| 2007/0270168 A1 | 11/2007 | Sheynblat | |
| 2009/0303120 A1 * | 12/2009 | Alizadeh-Shabdiz ... | 342/357.09 |
| 2010/0135178 A1 * | 6/2010 | Aggarwal et al. ........... | 370/252 |
| 2010/0324813 A1 | 12/2010 | Sundararajan et al. | |
| 2012/0133555 A1 | 5/2012 | Hyun | |

FOREIGN PATENT DOCUMENTS

| | | |
|---|---|---|
| WO | 2010/075369 | 7/2010 |
| WO | 2011/047310 | 4/2011 |

OTHER PUBLICATIONS

Written Opinion (10 pgs.) dated May 9, 2011 issued in corresponding International Application No. PCT/GB2010/052206.
UKIPO Search and Advisory Service Search Report dated Nov. 30, 2010 for subject "Dynamic Location Determination" (6 pgs.).
International Search Report (4 pgs.) dated May 9, 2011 issued in corresponding International Application No. PCT/GB2010/052206.
Wu, Shaohua et al., "NLOS Error Mitigation for UWB Ranging in Dense Multipath Environments", School of Electronic and Information Technology, Harbin Institute of Technology, Harbin, China and Shenzhen Graduate School, Harbin Institute of Technology, Shenzhen, China, 2007 (6 pgs.).

(Continued)

*Primary Examiner* — Jung Park
(74) *Attorney, Agent, or Firm* — Nixon & Vanderhye P.C.

(57) ABSTRACT

There is disclosed a method of estimating the location of a plurality of electromagnetic signal sources, comprising: scanning at a first plurality of locations to generate signal source position data, the signal source position data representing estimates of the position of at least one of said signal sources; scanning at a second plurality of locations using a signal detection system to generate signal detection data, the signal detection data relating to signals received at the second plurality of locations from the signal sources; processing the signal source position data in dependence on the signal detection data to correct estimation errors in the signal source position data; and outputting the processed signal source position data.

57 Claims, 10 Drawing Sheets

(56) References Cited

OTHER PUBLICATIONS

Examination Report (2 pgs.) dated Oct. 3, 2011 issued in corresponding GB Application No. 1115473.9.

Examination Report (1 pg.) dated Nov. 22, 2011 issued in corresponding GB Application No. 1115473.9.

Notification of Grant (2 pgs.) dated Dec. 19, 2011 issued in corresponding GB Application No. 1115473.9.

Examination Report (5 pgs.) dated Sep. 13, 2013 issued in corresponding EP Application No. 10 813 072.5-1812.

Translation of the Notice on the First Office Action (18 pgs.) dated Aug. 6, 2013 issued in corresponding Chinese Application No. 201080064669.7.

* cited by examiner

LOCATING ELECTROMAGNETIC SIGNAL SOURCES

FIELD OF THE INVENTION

The present invention relates to a method of and system for estimating the location of a plurality of electromagnetic signal sources.

BACKGROUND TO THE INVENTION

One example of an electromagnetic signal source is a wireless access point, such as a Wi-Fi base station (Wireless Access Point), which is used to communicate wirelessly with a device by the transmission and reception of electromagnetic radiation in the form of radio waves. Other electromagnetic signal sources may for example include optical (infra-red) communication devices and electromagnetic/wireless beacons of various sorts.

It is sometimes desired to estimate the location of electromagnetic signal sources. In one example, details of the location and other properties of wireless access points (WAPs), cellular telephone masts, and other electromagnetic signal sources are determined. A device operated by a user can then measure properties of electromagnetic signals (such as WAP radio frequency signals) detected at the device, and the location of the user can be calculated with reference to the previously determined location and other data. For example, a smartphone with Wi-Fi capability can determine the identity and signal strength of adjacent WAPs, and a triangulation can be carried out based on the known locations of the WAPs in question in order to determine the location of the smartphone (and hence user). Clearly, the better that the estimation of the location of the signal sources (WAPs) is, the better will be the resulting user location estimates.

In one particular example "war-driving" is used to determine the location of wireless access points (WAPs) within range of a vehicle as it is driven around. A global positioning system (GPS) or similar unit in the vehicle records the location of the vehicle, and signal detection equipment (including for example a highly directional antenna and Wi-Fi interface circuitry) identifies the relative position and other properties of the WAPs. The absolute position of the WAPs can then be determined using the two pieces of information. A similar process can be achieved by "war-walking", in which scaled-down equipment is carried around by a person to achieve the same effect.

War-driving suffers from limitations in the accuracy with which the position of WAPs and other signal sources can be determined. The propagation of signals is affected by environmental factors, and effects such as multi-path propagation and signal attenuation can become more significant the further away from the signal source that one goes. The necessary distance between vehicles on a road and WAP base stations (typically installed inside buildings away from the road) can lead to significant inaccuracies in the WAP location estimates, and other WAPs may not be detected at all at that distance. These factors can reduce the accuracy of a location service that uses data derived from the war-driving.

War-walking can allow detection equipment to be brought nearer to the WAPs and even inside buildings, but once inside the building the GPS receiver will typically fail, due to the loss of line-of-sight with the GPS satellites.

Therefore both war-driving and war-walking suffer from limitations in the accuracy in the estimate of the location of the WAPs and in some cases do not allow a location to be determined at all due to the failure of the GPS or similar positioning system.

SUMMARY OF THE INVENTION

A first aspect of the invention provides a method of estimating the location of a plurality of electromagnetic signal sources (such as wireless access points), comprising: scanning (for example with a hand-held or other scanner such as a mobile phone or laptop) at a first plurality of locations to generate signal source position data, the signal source position data representing estimates of the position of one or more said signal sources; scanning at a second plurality of locations using a signal detection system (such as a Wi-Fi transceiver) to generate signal detection data, the signal detection data relating to signals received at the second plurality of locations from the signal sources (and including, for example, data regarding received signal strengths and WAP base station identifiers); processing the signal source position data in dependence on the signal detection data to correct estimation errors in the signal source position data; and outputting (for example for storage in a database) the processed signal source position data. In one embodiment the signal source position data represents estimates of the position of each (every) signal source.

The signal source position data includes for example the 2D or 3D co-ordinates of wireless access points (WAPs) and their identifiers or other electromagnetic signal sources and their identifiers, and may include further information such as signal strengths, position accuracy estimates, and so on. The method may be carried out in any appropriate device or location, for example in a portable handset or other device that may be carrying out the scanning operation, and/or in a remote server system. In particular the processing steps can be but need not be carried out by the same processor, computer, microcontroller or other device, and individual processing steps may be subdivided and distributed across different processors as required.

By scanning a second time at a second set of locations (for example in closer proximity to the WAP base stations in areas not accessible by war-driving) using a signal detection system such as a Wi-Fi interface, estimates of the location of the signal sources can be corrected without the need for GPS-like functionality to be provided at the second set of locations. The correction may not in every case improve the estimation of the position of a specific signal source, but the estimation of the signal sources as a whole is generally improved. There may of course be specific environments and configurations of signal sources and scanning locations that may defy this trend (for example due to scanning in signal blackspots, extreme propagation effects such as multipath effects, and the like).

Preferably the signal detection data Includes at least one of signal strength, MAC addresses (for networked devices, if appropriate) or other identifier associated with a signal source, signal quality, and so on. Preferably the processing of the signal source position data comprises applying to the signal detection data at least one of the algorithms of time of arrival (TOA), time difference of arrival (TDOA), angle of arrival (AOA), and received signal strength (RSS).

The processing of the signal source position data preferably further comprises using the signal detection data to estimate the position of the second plurality of locations. The estimation of the position of the second plurality of locations (that is, the places where the second set of scans were carried out) can for example be presented to a person operating the scanning device to allow a visual or other check to be carried out (and the estimated scanning locations can for example be cross-referenced against other data, for example to check that the estimated location is not within a wall or other inaccessible and clearly incorrect location).

The method may further comprise receiving location information data representing information about the second plurality of locations, and processing the signal source position data may further comprise using the location information data to estimate the position of the second plurality of locations. For example, the location information data may comprise a user estimate of the position of at least one of said second plurality of locations. Preferably the method further comprises inputting the location information data via a user input device, such as a handheld unit. The method may comprise receiving data from a user which enables or enhances the estimation of the second plurality of locations. The method may comprise receiving data from one or more additional sensors which measure a parameter relating to movement, direction or altitude, for example, one or more of a magnetometer, an accelerometer, a barometer. Such received data may be taken into account when estimating the position of the second plurality of locations.

The location information data can improve the estimation of at least one of the second plurality of positions. In one example the user can input a correction to an approximate GPS (if available) or other positioning system reading if it appears that the reading is incorrect. The user can also (or alternatively) input additional reference data such as a height, which can for example overcome the relative inaccuracy of height readings in GPS and similar systems. The height may most easily be inputted in the form of the story number of a building in which the user is located; the story number can be converted into a height relatively approximately by multiplying an average/universal story height (such as 5 meters, 10 meters or somewhere inbetween) with the story number and adding to a height datum for the location, for example, or using more detailed information about the building in question or the location to obtain a more accurate result.

Processing the signal source position data may additionally or alternatively further comprise processing the signal detection data in accordance with an environmental model representing environmental factors applying to the signal sources. This can allow various environmental factors (such as the density of population of a building, presence or absence of various structural features, thickness of walls, reflectiveness of surfaces, and so on) to be taken into account to improve the accuracy of the estimation. In this case, the method preferably further comprises receiving at least one of environmental model selection data representing a choice of environmental model and environmental model parameter data representing a choice of at least one parameter of the environmental model, and processing the signal detection data in accordance with said at least one of the environmental model selection data and the environmental model parameter data.

The method may further comprise inputting said at least one of environmental model selection data and environmental model parameter data via a user input device. Alternatively the selection data or parameter data may be inputted elsewhere, for example after the survey has been carried out, by a surveyor or system operator with appropriate knowledge, experience or training. In another embodiment the model or model parameters may be (to an appropriate degree) derived automatically (for example by sensing devices or by cross-referencing the estimated scanning location to related geographical data, for example).

Different environment models may be applied in dependence on certain measurable factors. For example a different environmental model may be applied in dependence on whether the scanning location is indoors or outdoors (such as the Stanford University Interim, SUI, Model, for example).

Essentially any appropriate data used in the processing steps described herein may to an appropriate degree be inputted by a user, either at the scanning site (for example using a handheld device) or remotely (either coincident with the scanning process or at a later time/date).

Furthermore the processing of the signal source position data preferably further comprises generating further signal source position data representing new estimates of the signal sources in dependence on the signal detection data. The further signal source data (for example a list of updated estimated co-ordinates of WAP base stations) can for example be plotted to allow a visual comparison of the previous and current estimates of the locations of the signal sources. As before, the new estimate data can be cross-referenced, for example to check that the new estimated locations are plausible.

Preferably the method further comprises processing the signal source position data and the further signal source position data to determine an appropriate adjustment to the signal source position data. Any appropriate process may be used to determine the appropriate adjustment, including least squares estimation methods, for example.

The method may also further comprise processing the signal detection data to estimate the location of additional signal sources that were not detected at the first plurality of locations, and adding additional signal source position data to the signal source position data. Thus the second phase of scanning (at the second set of locations) may for example uncover signal sources (such as WAP base stations) that were not found in the first phase of scanning (at the first set of locations).

The scanning at the first plurality of locations preferably comprises: scanning at the first plurality of locations to generate initial signal detection data, the initial signal detection data relating to signals received at the first plurality of locations from the signal sources; processing the initial signal detection data in dependence on first scanning position data, the first scanning position data representing the position of each of the first plurality of locations, in order to generate the position estimate data. Accordingly the signal sources can be used in both phases to facilitate the estimation of the position of the sources.

The scanning at the first plurality of locations may comprise using the (aforesaid) signal detection system to generate the initial signal detection data. Alternatively a different signal detection system may be used as appropriate. For example more sophisticated vehicle-mounted equipment may be used for the first phase of scanning, and less sophisticated but more mobile equipment may be used for the second phase of scanning.

The method may further comprise using a positioning system (which may be an absolute positioning system, for example a global navigation satellite system such as GPS or AGPS, GLONASS, Beidou-2 or Gallileo) at each of the first plurality of locations to generate the first scanning position data. The positioning may for example include GPS/AGPS devices, cell tower-based triangulation, inertial sensors, GIS, or a hybrid system combining two or more such subsystems. Alternatively manual methods may be used, for example using data entry by an operator of the scanning equipment. Conventional printed maps may be used, for example, to establish the position of each location. Other processes for determining the location are of course possible as appropriate. A user interface may be provided to enable a user to input data to enable or to enhance performance of a positioning system such as GPS assistance data (estimated position, time, ephemerides etc) for GPS. The method may comprise receiving data from one or more additional sensors which measure a parameter relating to movement, direction or altitude, for example, one or more of a magnetometer, an accelerometer, a barometer.

The positioning system may generally be more effective at the first plurality of locations than at the second plurality of locations. The positioning system may furthermore not be operable in at least one of the second plurality of locations (or indeed may not be operable in over 25%, 50%, 75%, 80%, 90% or 95% of the second plurality of locations). For example the second plurality of locations may be partially (for example over 25%, 50%, 75%, 80%, 90% or 95%) or wholly indoors, preventing effective operation of GPS and other absolute/global positioning systems.

Conversely, the signal detection system may be generally more effective at the second plurality of locations than at the first plurality of locations. The signal detection system may for example only work (or work most effectively) in relatively close proximity to the signal sources or in the absence of attenuating materials between the detection system and the signal source, for example partially (such as over 25%, 50%, 75%, 80%, 90% or 95%) or wholly indoors or unobstructed by walls. It may be that the first plurality of locations, for example constrained by requirements such as allowing the passage of a vehicle, may in general be too far from the (majority of) signal sources to allow effective detection.

The method may further comprise scanning using a signal detection system at a further plurality of locations to generate further signal detection data, and further processing the signal source position data in dependence on the further signal detection data. Thus the second phase of scanning can be repeated once, twice, three or even more times in order further to refine the accuracy of the positional estimates.

In a further embodiment a second (or further) signal detection system can be used at the first or second (or further) plurality of scanning locations, to complement the (first) signal detecting system and further to improve the accuracy of the location estimates. The first, second and (optionally) further phases of scanning need not be carried out at substantially the same time (on the same day, or on the same week, and so on).

The method may further comprise processing the signal source position data to generate map data representing a map of the signal sources. The term 'map' preferably connotes a data set including data that encodes and/or identifies at least one geographical or other location. The map may for example be a set of records where each record provides the 2D or 3D co-ordinates of a signal source and may also include further data about the signal source such as an assigned name or identifier. The map may be embodied in a computer-readable signal or medium or may, for example, be a physical representation of the signal sources in a human-readable form (overlaid, for example, on a conventional geographical plan). The map may be encoded in any appropriate format, such as the GIS file standard for example.

The signal source may be a wireless access point, such as a base station in a wireless communications network. The signal source may be a Wi-Fi or Wi-Max base station, GSM or other cellular communications tower, a radio transmitter or beacon, or any other appropriate electromagnetic signal source. The signal source may facilitate unidirectional (such as a simple transmitter) or bidirectional (such as a network node) communication, for example.

At least one of the signal detection data, the signal source position data and the processed signal source position data may be transmitted via the wireless access point. This can facilitate the distribution of processing of the data between, for example, a hand-held device with limited computing power and storage, and a remote server and database. Alternatively all processing and scanning functionality may be carried out using the same device.

At least part of the scanning is typically carried out using a hand-held portable device. For example the second phase of scanning (at the second plurality of locations) and optionally also the first phase of scanning (at the first plurality of locations) may be carried out using a suitably-equipped hand-held device such as a suitably configured mobile telephone, laptop or hand-held device customised for the specific application.

Additionally or alternatively, at least part of the scanning may be carried out using a vehicle-mounted portable device. For example at least the first phase of scanning may be carried out using a vehicle-mounted device that could have improved power and selectivity (for example using a direction antenna) compared to a hand-held device.

The method may further comprise: storing the processed signal source position data; receiving a user location request from a user device (such as a mobile telephone or other portable device), the user location request Including data obtained from a signal detection system (such as a Wi-Fi receiver) associated with the user device; processing the stored signal source position data in dependence on the user location request data to generate user location data representing an estimate of the location of the user device; and outputting the user location data.

Accordingly the aforementioned method can be integrated into a user location service. The user location method may use additional systems in the user device or remote server (or elsewhere, for example via the Internet) to assist in estimating the user device's location. For example in-built GPS receivers in the user device may be used.

In any of the methods as aforesaid, the scanning may be carried out by a user travelling between a plurality of locations (such as between the first plurality of locations, and/or between the second plurality of locations), for example on foot, via a vehicle or either. The user may interact with any type of hardware to facilitate any of the other method steps mentioned above (or below).

In another aspect of the invention there is provided a method of estimating the location of a plurality of electromagnetic signal sources, comprising: inputting signal source position data, the signal source position data representing estimates of the position of one or more said signal sources obtained by scanning at a first plurality of locations; inputting signal detection data, the signal detection data relating to signals received at a second plurality of locations from the signal sources; processing the signal source position data In dependence on the signal detection data to correct estimation errors in the signal source position data; and outputting the processed signal source position data. This method may find particular application for example in relation to computer code for a server that is operable to communicate via a network or other communications link with a user device at a scanning location.

In a further aspect of the invention there is provided a portable unit programmed with computer program code for causing the portable unit to carry out a method as aforesaid.

In a yet further aspect of the invention there is provided a server programmed with computer program code for causing the portable unit to carry out a method as aforesaid.

Although the embodiments of the invention described above with reference to the drawings comprise methods performed by computer apparatus, and also computer apparatus, the Invention also extends to program instructions, particularly program instructions on or in a carrier, adapted for carrying out the processes of the invention or for causing a computer to perform as the computer apparatus of the invention. Programs may be in the form of source code, object code, a code intermediate source, such as in partially compiled form, or any other form suitable for use in the implementation of the processes according to the invention. The carrier may be any entity or device capable of carrying the program instructions.

For example, the carrier may comprise a storage medium, such as a ROM, for example a CD ROM or a semiconductor ROM, or a magnetic recording medium, for example a floppy disc, hard disc, or flash memory, optical memory, and so on. Further, the carrier may be a transmissible carrier such as an electrical or optical signal which may be conveyed via electrical or optical cable or by radio or other means. When a program is embodied in a signal which may be conveyed directly by cable, the carrier may be constituted by such cable or other device or means.

Although various aspects and embodiments of the present invention have been described separately above, any of the aspects and features of the present invention can be used in conjunction with any other aspect, embodiment or feature where appropriate. For example apparatus features may where appropriate be interchanged with method features.

DESCRIPTION OF THE DRAWINGS

An example embodiment of the present invention will now be illustrated with reference to the following Figures in which.

DETAILED DESCRIPTION OF AN EXAMPLE EMBODIMENT

A method and system will be described for locating electromagnetic signal sources, with a particular (but not exclusive) application to a system for locating a user device by cross-referencing signals received at the user device with data previously gathered using the abovementioned method and system.

In one particular embodiment a method is described in relation to dynamically determining the location (such as position co-ordinates) of Wireless Access Points (WAPs) or Wireless Beacons in wireless technology-based positioning systems. Predominantly the wireless standard described in this document is Wi-Fi and the positioning system is a Wi-Fi-based system, but this method can equally be applied to other related standards such as Bluetooth and radio-frequency (RF) and other systems. Furthermore this method can also be applied in determining the location of base stations in other communication technologies such as mobile communication (such as GSM and CDMA for example), Wi-Max and so on.

In a WI-FI-based positioning system, the co-ordinates/location of WAPs are used together with other signal processing algorithms to estimate users' location in Wireless Local Area Networks (WLAN). Here, the users can be mobile or stationary within WLAN and have any device with inbuilt or external Wi-Fi capability. This device may also have a capability to connect to the Internet for exchanging parameters with central server, for example Wi-Fi system parameters such as Mac addresses, signal strength, their co-ordinates etc. One example is a user with a mobile phone using inbuilt WI-FI to connect to the Internet. Hence, in this positioning method, a user's location accuracy relies heavily on the accuracy of the known position of the WAPs in respective WLANs.

War-driving and war-walking, described above, are some techniques for determining and/or mapping a WAP's position.

Figure 1:
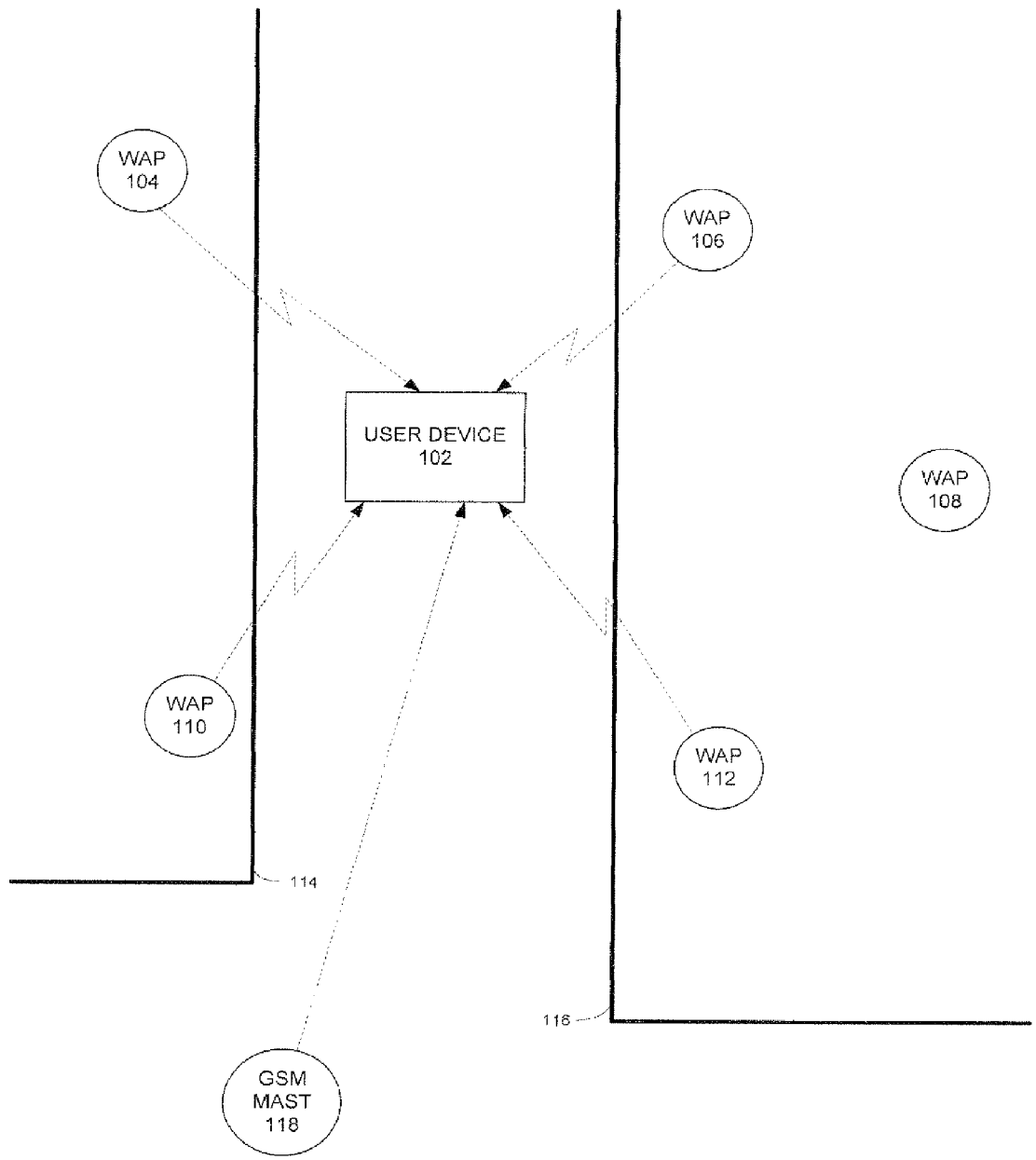
FIG. 1 is an illustration in overview of a system for locating a user device using Wi-Fi wireless access point (WAP) signal sources.

FIG. 1 is an illustration in overview of an example system for locating a user device using Wi-Fi wireless access point (WAP) signal sources. A user device 102 is operated by a user (not shown) and contains a Wi-Fi adaptor (also not shown). A number of wireless access points (WAPs) 104, 106, 108, 110, 112 are located in the immediate vicinity of the user within two buildings 114, 116. Because of signal attenuation, transmission power limits and other factors, only WAPs 104, 106, 110, can be detected by the Wi-Fi adaptor in the user device 102. The WAP 108 is not detected by the user device 102. A GSM (mobile telephone) mast 118 and others may also be present, and properties of these and other electromagnetic signal sources may also be measured and used in the location finding system.

The user device 102 can measure certain characteristics of the signals, either in terms of the signal qualities such as signal strength, angle of incidence, and so on, or in terms of the data carried by the signal, such as the MAC address or other identifier associated with the transmitting WAP.

The system processes various of the signal characteristics and compares the characteristics with data in a database. As is described in more detail below, the location system can use the stored data relating to some or all of the relevant WAPs 104, 106, 110, 112 to triangulate (or otherwise determine) the position of the user device 102 and hence also the user.

A method and system will now be described in which the disadvantages of both war-driving and war-walking methods can be substantially overcome, using a multi-phase process and using dynamic and self-correcting recursive techniques to determine location co-ordinates of WAPs accurately inside buildings and in difficult environments (for example with many obstacles). To search and determine WAPs' location co-ordinates will be referred as "scanning" and "mapping" respectively here onwards.

Figure 2:
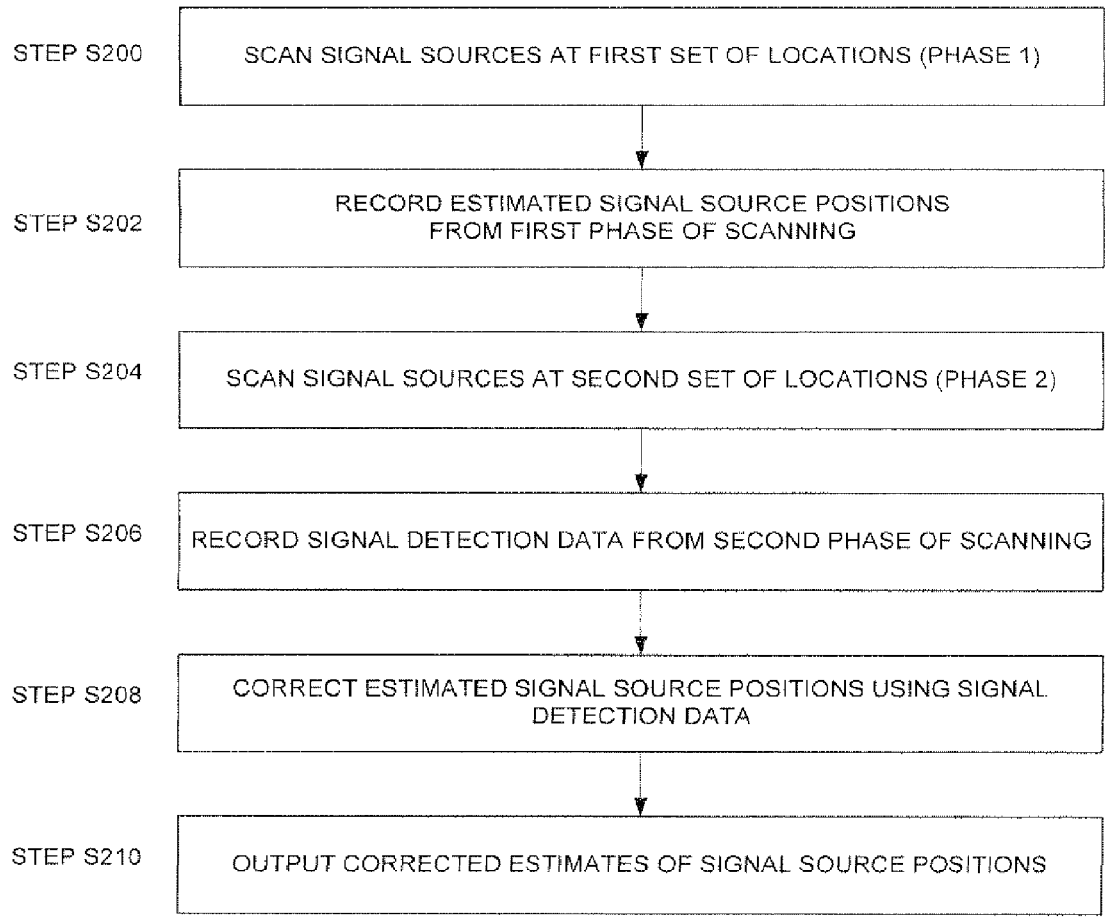
FIG. 2 is a flowchart illustrating a process for locating the position of wireless access points (WAPs) for use in the system of FIG. 1.

FIG. 2 is a flowchart illustrating a process for locating the position of wireless access points (WAPs) for use in the system of FIG. 1.

In step S200, in a first phase of the process, signal sources (signals from the WAPs) are scanned at a first set of locations. Various scanning processes can be used, for example using a hand-held device such as a mobile telephone, smartphone or other device, and either outside or inside a building (in the present embodiment). In an alternative embodiment the first set of locations is formed from the path of a vehicle carrying out a war-driving procedure. As described above and below (for example in relation to FIG. 7), the data gathered during the scanning process is used to generate estimates of the positions of the signal sources (WAPs). These estimated positions are then stored (in step S202). In the first phase of scanning the positions of the WAPs are usually (but not necessarily) estimated by combining the output of a global or absolute positioning system such as GPS or AGPS with the result of a relative positioning system such as triangulation using WAP signal strengths (again described below in more detail). In another embodiment the first set of estimated positions may for example merely be drawn from a map or plan of the building or area in which the scanning takes place and entered by user directly using device's user interface in to the processing software. The term 'scanning' may thus be interpreted quite broadly in such a case.

In step S204, in a second phase of the process, signal sources (the WAP signals) are scanned again at a second set of locations. In a preferred embodiment the second set of locations is the path of a scanning operative generally within or amongst buildings that have been scanned at a distance by the war-driving in phase 1. In other embodiments the scanning is automated and may be carried out by the same or a differently configured war-driving set-up. The scanning locations may be chosen by an operative 'on the ground' or determined in real-time or prior to the scanning operation as a result of an analysis of the results gathered in phase 1 (for example with reference to geographical and/or commercial data relating to the scanning environment and the buildings and other structures therein. The scanning results are recorded in step S206.

As is described in more detail below, the user may also record their own estimate of the position of the second set of locations or may input a correction (where appropriate) to an automatically derived (by GPS, for example) estimate of the positions, and may also input a selection of environmental model to apply and/or parameters for use with such a model (as is discussed in more detail below). A user may also input data to enable or to enhance performance of a reference positioning system such as GPS assistance data (estimated position, time, ephemerides etc) for GPS.

In step S208 the first set of estimated WAP locations (or locations of other signal source such as mobile telephone masts and so on) are processed and corrected using the results of the second phase of the scanning process. This process is described in more detail below. The corrected estimates are then output in step S210.

In the first embodiment, the user or a group of users carrying out the mapping process have compact consumer devices (such as smart mobile phones, laptops and so on) or sophisticated electronic devices (such as a customised computing device, amplifiers, antennas etc) with Wi-Fi capability, and preferably other positioning system capability such as GPS/AGPS, cell tower based positioning, and so on. These devices may have additional sensors which could assist in positioning, for example, an accelerometer, magnetometer etc. These devices may also have the capability other than Wi-Fi to connect to the Internet such as through mobile Internet service provider gateways.

Users may for example be equipped with Stasis proprietary software running on a consumer mobile device with or without any operating system and having a micro-controller, GPS/AGPS and Wi-Fi hardware capabilities. Essentially all of the scanning and mapping processes described herein including multiple phases of scanning can be carried out using software such as this using previously described hardware when needed. The chosen software may also be capable of using a user's input to record information about the area/places where scanning/mapping is being done, such as position co-ordinates, types of buildings, height information such as scanning floor etc., urban or rural place types and so on when needed.

Figure 3:
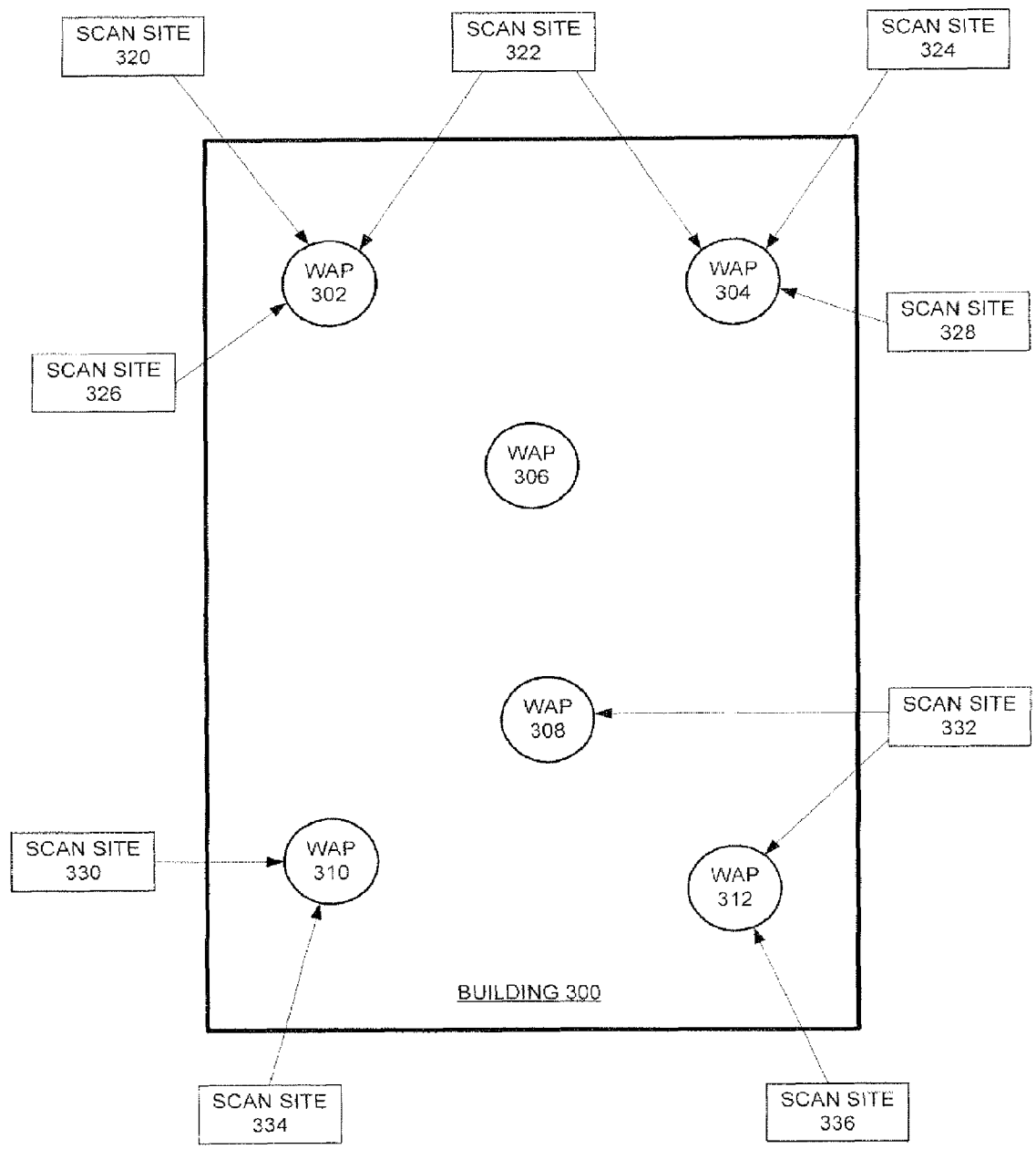
FIG. 3 is an illustration of the first phase of scanning of a set of wireless access points (WAPs) in a building in accordance with the process of FIG. 2.

FIG. 3 is an illustration of the first phase of scanning of a set of wireless access points (WAPs) in a building in accordance with the process of FIG. 2.

In FIG. 3 a building 300 contains six WAPs 302, 304, 306, 308, 310, 312. Nine scanning sites 320, 322, 324, 326, 328, 330, 332, 334, 336 are chosen around the perimeter of the building, although in practice this may be around fewer than all sides, and may for example only be along one or two sides of the building (depending on accessibility, for example). It will be appreciated that more or fewer WAPs may be found and more and less scans (and corresponding scanning locations) may be used, depending for example on the size of the building and the complexity of the environment.

The WAPs (shown in circles) are placed in a typical building at different places. In the present embodiment a user described earlier with a consumer device such as smart phone with Wi-Fi and GPS/AGPS capability can scan this building from different places from outside (shown in a rectangular box) all around the building. At every place user records Wi-Fi scanning parameters such as signal strength, MAC addresses of visible WAPs, Signal Quality etc. and user's own position through GPS/AGPS. The user may also record other useful environment specific data from observation and/or prior knowledge such as height and type of building, numbers and types of physical signal obstructions close to the scanning place etc. The user may also record data from additional sensors on or in the device, if available, to assist in positioning. For example, they may record heading data received from a magnetometer, height information from a barometer etc.

As stated earlier, any other position system or methods excluding GPS and its variants may also be used to locate user's position such as Cell Tower based triangulation, Inertial Sensors, User Position Inputs, GIS etc. or any Hybrid system combining these technologies.

As can be seen from FIG. 3, many WAPs can be scanned from more than one place from outside. For example WAPs 302, 304 are scanned from three locations, WAPs 310, 312 are scanned from two locations, and WAP 308 is scanned from one location. WAP 306 is not scanned from any location because of its central location in the building and lack of visibility of the signals from the outer scanning locations.

The records from the scanning process are processed together by software installed on the device using various signal processing algorithms to determine the distances between user location at different places and visible Wireless Access Points, and subsequently to create a map of these WAPs.

A number of distance measurements algorithms exist to allow positioning using a Wi-Fi or other comparable system. The algorithms include, for example, Time of Arrival (TOA), Time Difference of Arrival (TDOA), Angle of Arrival (AOA), Received Signal Strength (RSS), and so on. Depending on the technical capabilities of the software, mobile devices and WAPs, the RSS based distance measurement algorithm is normally employed but the other algorithms may also be used as appropriate.

In the RSS algorithm, the strength (power) of a Wi-Fi signal at the receiver (user) is measured in comparison to the transmitted strength of a signal from the radio source (WAP) and is given by following mathematical equation in free space:

$$P_r = \frac{P_t G_t G_r \lambda^2}{(4\pi)^2 d^2} \tag{1}$$

Where $P_r$ is the received power, $P_t$ is a transmitted power, $G_r$ and $G_t$ are receiver and transmitter antenna gains respectively, $\lambda$ is a signal wavelength and d is a distance between source and receiver. This equation can also be represented in terms of propagation gain (PG) as:

$$PG = \frac{P_r}{P_t G_t G_r} = \left(\frac{\lambda}{4\pi d}\right)^2 \tag{2}$$

and in decibels form as:

$$PG_{dB} = 20 \log\left(\frac{\lambda}{4\pi d}\right) \tag{3}$$

The free space model (equations) cannot easily be applied in real world environments without modifications because of the signal propagation uncertainties. WI-FI signal propagation can be affected by many factors such as signal attenuations and reflections (multipath effects) from the surfaces, building types, moving objects and people, transmission frequency, antenna heights and polarisation, and so on. However, various models exist to try to model different environments and signal propagation behaviour through them to determine the distance between receiver and source. For example, there are models available to predict signal behaviour for different indoor environments. One of the indoor models is described by the following equation:

$$PG_{dB} = 20 \log\left(\frac{\lambda}{4\pi d_0}\right) + 10n \log(d_0) + X_\sigma \tag{4}$$

for $d > d_0$

Where X, n and $d_0$ are the parameters which vary with different indoor environments and which can be determined empirically. For example, the values of X, n and $d_0$ for a typical hard partitioned office environment are 7.0, 3.0 and 100 respectively.

User input can be provided to select types of environment and then to use specific values of the abovementioned parameters stored in memory (that were for example previous input by the user or other operator). Alternatively, if user inputs are not available default values can be chosen from the software configuration.

There are also models available for outdoor environments for example. One such model, designated as Stanford University Interim (SUI) Model, is described by the following equation:

$$PL = 20 \log\left(\frac{4\pi d_0}{\lambda}\right) + 10n \log\left(\frac{d}{d_0}\right) + X_f + X_h + s \tag{5}$$

for $d > d_0$

PL is described as path loss and other parameters can be processed similarly as described in for indoor models, that is (for example) either through user inputs or from software configuration.

Once all the distances are determined using any of the models available, they are processed together with reference location co-ordinates of the places where user have scanned from to map visible WAPs one by one. Depending on the number of measurements (records) for a specific WAP, various methods are available to map these WAPs. One method, triangulation, is described below with reference to FIG. 8.

Figure 4:
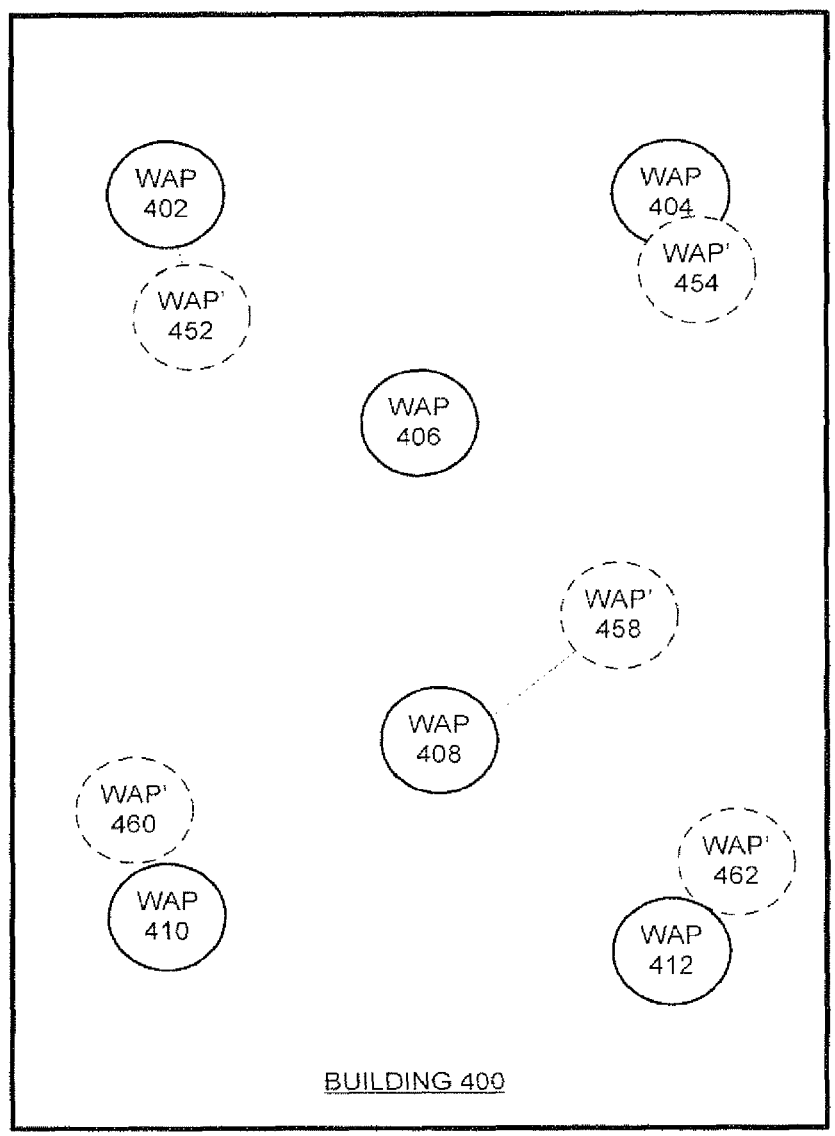
FIG. 4 is an illustration of the estimated positions of the WAPs of FIG. 3 after the first phase of scanning in the process of FIG. 2.

FIG. 4 is an illustration of the estimated positions of the WAPs of FIG. 3 after the first phase of scanning in the process of FIG. 2.

In FIG. 4 the actual locations of WAPs 402, 404, 406, 408, 410, 412 are shown with a solid circle, and the estimated locations WAP' are shown by the overlaid, dashed circles 452, 454, 458, 460, 462 corresponding to WAPs 402, 404, 408, 410, 412 respectively. There is no WAP' estimate 456 because the corresponding actual WAP was not found in the first phase of scanning.

Again it can be seen that WAP 406 is not mapped because of its signal visibility at any of the nine scanning locations outside of the building. The accuracy of the mapped WAPs depend on many factors such that the scanning distance, modelling of the environment, the accuracy of the user position, the number of scans (measurements) from outside the building for a WAP as well as the geometry of those places in reference to respective WAP, and so on.

Figure 5:
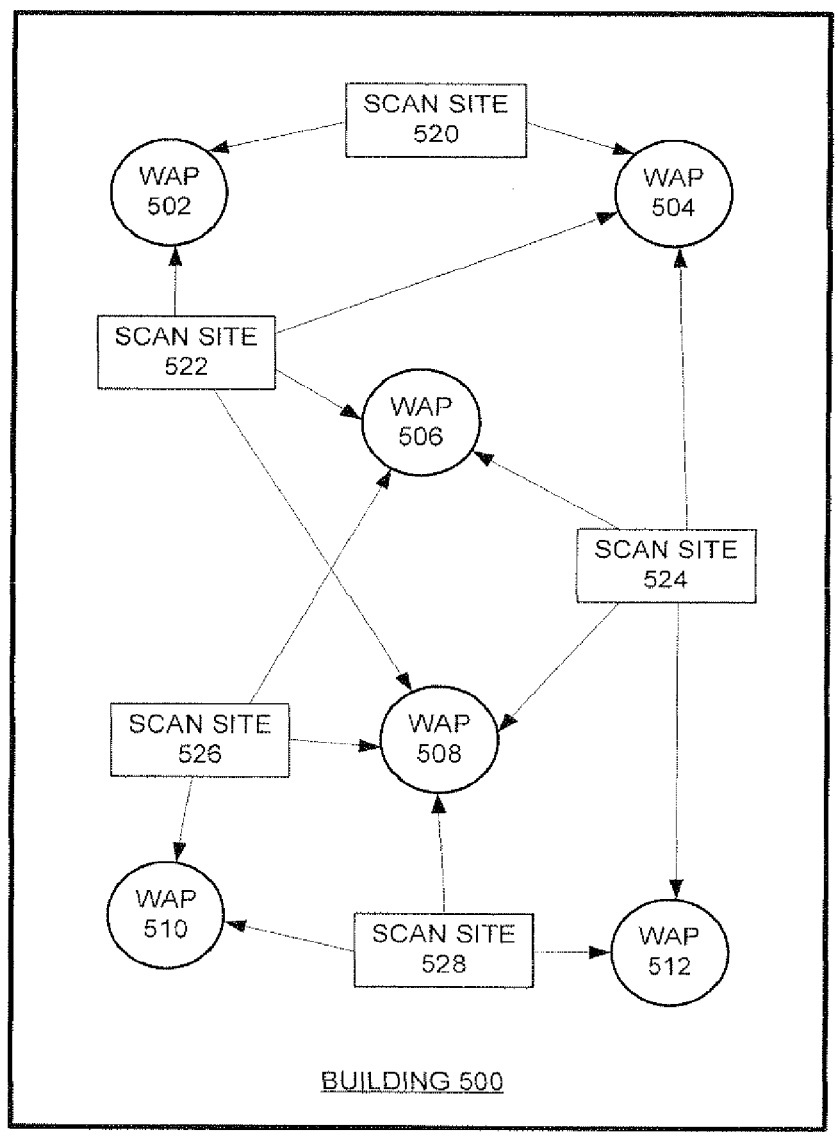
FIG. 5 is an illustration of the second phase of scanning of the set of wireless access points (WAPs) in the building of FIG. 3.

FIG. 5 is an illustration of the second phase of scanning of the set of wireless access points (WAPs) in the building of FIG. 3. In the building 500 the six WAPs 502, 504, 506, 508, 510, 512 are again shown. Five new scan sites 520, 522, 524, 526, 528 are chosen inside the building, interspersed (where possible) between the WAPs.

As mentioned, in the second phase of mapping, the scanning points are located inside the building where a user doing the mapping generally does not have GPS/AGPS availability. In this case a user's co-ordinates at these five places will be derived using Wi-Fi positioning technology. Wi-Fi positioning will use the co-ordinates of mapped (using the first phase of scanning as described above) and other available WAPs at respective places inside the building. For example, a user at place 524 will use WAPs 504, 508, 512 to locate himself using the phase 1 mapped WAPs' co-ordinates with other signal processing algorithms such as distance measurements using Wi-Fi signal strengths, environmental modelling such as through user inputs and triangulation, and so on as described above with reference to phase 1.

A user (or other operator, for example processing received survey data at a central location) has the facility to input his own estimation of the position of the second set of locations or to input a correction (where appropriate) to an automatically derived estimate of the positions (for example to correct an apparently incorrect or overly inaccurate GPS reading if available and being used). A user may also Input data to enable or to enhance performance of reference positioning system such as GPS assistance data (estimated position, time, ephemerides etc) for GPS if available and being used. The user may in particular record a perceived height or other measure (such as the story number in the building) allowing a height or other dimension to be estimated with more accuracy. If a baseline height $h_b$ is available for a particular location (for example using data derived from topographical maps), a height estimate h can be computed as $h_b + h_s \times s$, where $h_s$ is the estimated height per story (based on a global or local average or using specific knowledge about a building at the scanning location, for example) and s is the story number (0 being the ground floor, 1 being the first floor, and so on, using UK terminology). In one embodiment using inertial (or differential) positioning, for example, a user can when appropriate input datum (or absolute) values to allow calibration of the inertial positioning system.

The user may also in particular input a selection of environmental model to apply and/or parameters for use with such a model (see below for a discussion of some possible environmental models and their parameters). The selection of the environmental (and other data) may for example be made using drop-down menus or other input devices in a user interface (such as an interactive application running on a hand-held device carried by a user).

In the absence of sufficient points to allow triangulation or a user-supplied positional estimate, for example, other possible methods such as weighted average can be used (including if necessary a manual input by the scanner user or operator processing the data at a later stage) to obtain a 'best guess' of the scanning location.

During the second phase of scanning, all of the six WAPs 502, 504, 506, 508, 510, 512 are scanned from inside the building, on account of the closeness to the scanning user and typical absence (for example) of thick structural walls to attenuate the signal. It can be seen that many WAPs can be scanned from more than one place. For example WAP 508 is scanned from locations 522, 524, 526, 528. Similar to phase one, at every place user again records Wi-Fi scanning parameters such as signal strength, MAC addresses of visible WAPs, Signal Quality etc. and user's own position. User may also records other useful environment specific data from observation and/or prior knowledge such as height and type of building, numbers and types of physical signal obstructions close to the scanning place etc. The user may also records data from additional sensors on the device if available to assist in positioning such as magnetometer which can provide heading, barometer which can provide height information etc.

Figure 6:
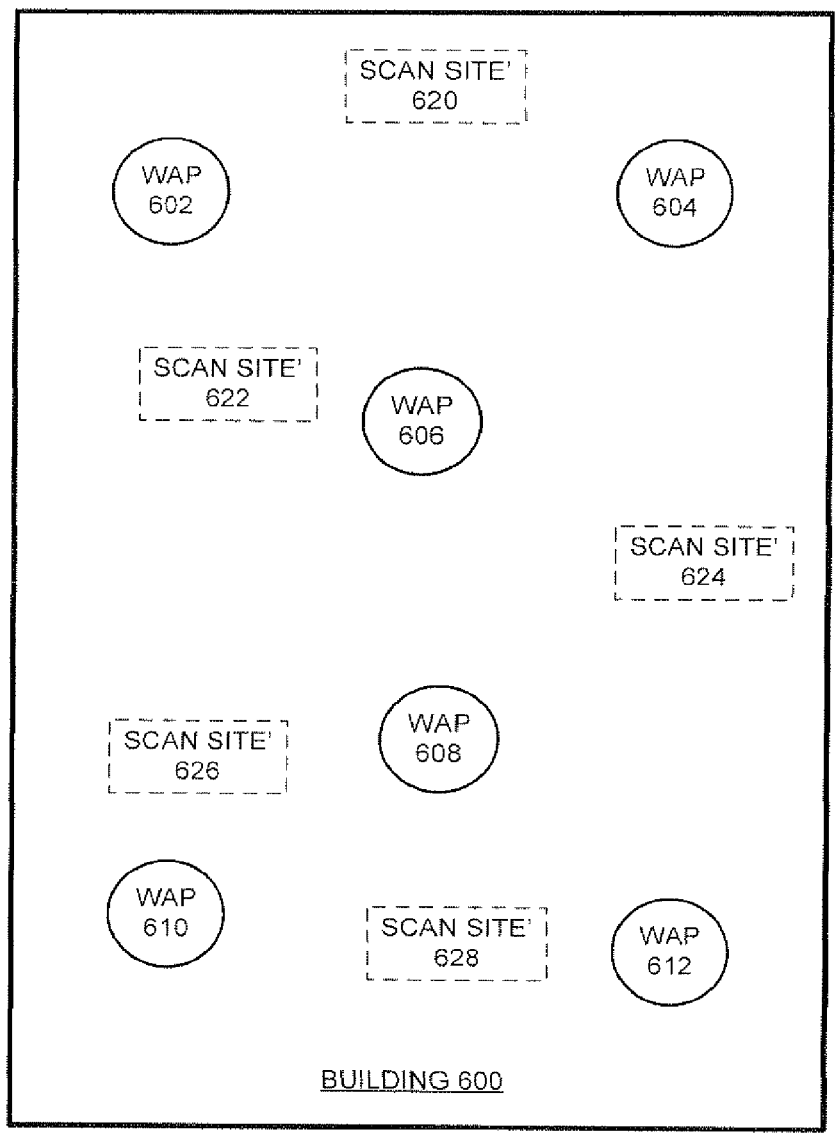
FIG. 6 is an illustration of the estimated positions of the scanner during the second phase of scanning shown in FIG. 5.

FIG. 6 is an illustration of the estimated positions of the scanner during the second phase of scanning shown in FIG. 5, in accordance with the process described above. As before the six WAPs 602, 604, 606, 608, 610, 612 in the building 600 are shown. Also shown are the estimated positions of the scanner at scan site 620, 622, 624, 626, 628, which vary from the actual scan sites by varying degrees in dependence on the above-mentioned factors that affect the signal propagation, for example.

In a further embodiment in which the device has an Internet connection, a user's co-ordinates can also be derived using a central web-server by exchanging Wi-Fi parameters with it. In this case a central web server is operable to provide a user's location either through an internal database or from other Internet resources. In some cases the user may also use GPS/AGPS co-ordinates as well as any other positioning technology if it is available. Users can also input information such as co-ordinates, environment types, and so on (as described above regarding phase I) in the processing software to aid mapping process.

The records formed from scanning from all of the five scanning locations are processed together in a software on a device with different signal processing algorithms such as distance measurements using Wi-Fi signal strengths, environmental modelling using user inputs, triangulation, and so on to (generally more accurately) map WAPs inside the building.

Figure 7:
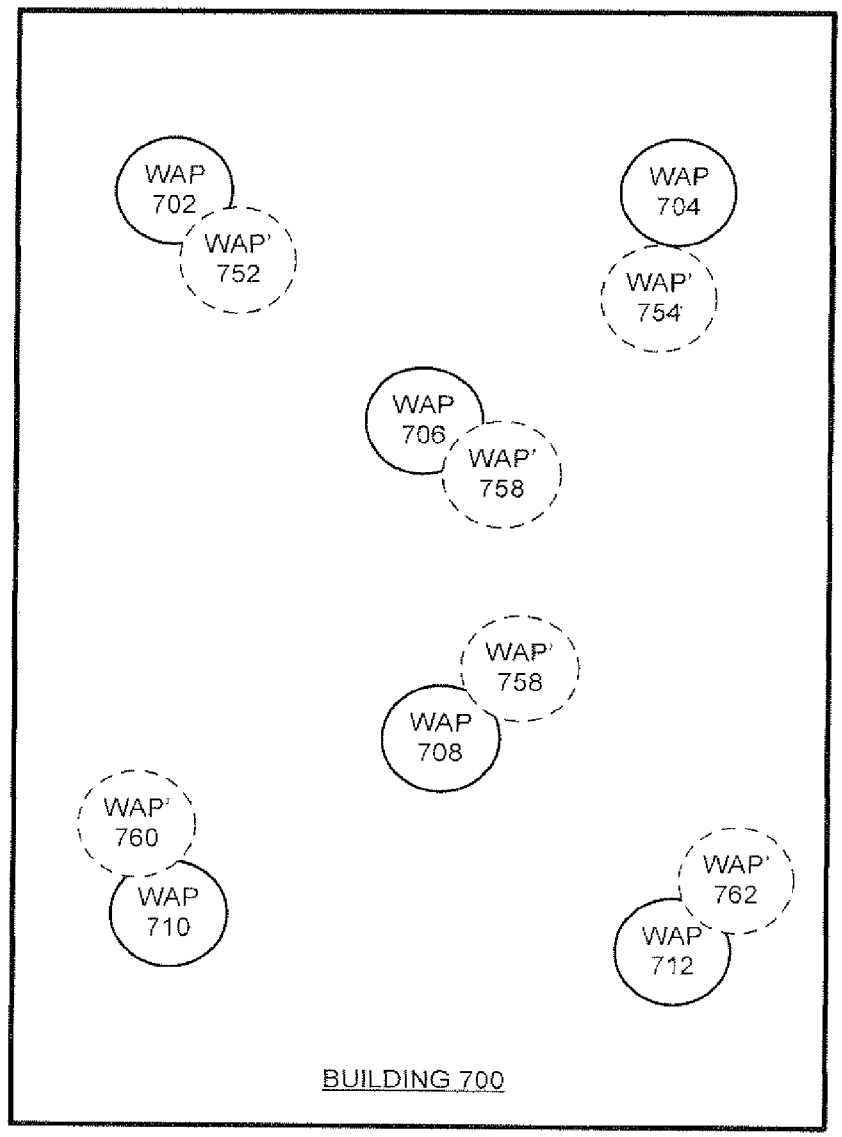
FIG. 7 is an illustration of the estimated positions of the WAPs of FIG. 3 after the second phase of scanning in the process of FIG. 5.

FIG. 7 is a schematic illustration of the estimated positions of the WAPs of FIG. 3 after the second phase of scanning in the process of FIG. 5. In FIG. 7 the actual locations of WAPs 702, 704, 706, 708, 710, 712 are shown with a solid circle, and the estimated locations WAP' are shown by the overlaid, dashed circles 752, 754, 756, 758, 760, 762 corresponding to WAPs 702, 704, 706, 708, 710, 712 respectively.

It can be noted that in this hypothetical case the estimates of the positions of the WAPs are generally improved, although in individual cases such as for WAP 704 (and estimate WAP' 754) the estimate can become less accurate with regard to the first phase (as illustrated in FIG. 4). Phase II has also mapped WAPs that were not mapped in phase I (for example WAP 706).

Though a user's co-ordinates (derived inside from Wi-Fi positioning after phase I) at scanning points may not be accurate in comparison to user's co-ordinates (derived outside using GPS/AGPS), the overall improvement of mapping accuracy and coverage of mapped WAPs are increased after second phase of mapping due to the closeness of the scanning/mapping user (inside the building) to WAPs and hence to be able to measure the distance between user and WAPs by predicting signal propagation path more accurately through applying indoor signal propagation models described above with regard to phase I.

This whole mapping process can be extended to subsequent phases to Improve coverage and some level of accuracy as many times as improvements may be seen in mapped co-ordinates of WAPs. The process remains essentially the same as of phase II and can be repeated for example to rescan a previous site with more scanning locations, either inside our outside a building, for example if a particular site is identified as being a particularly difficult environment (for example after review of the initial scanning data).

Figure 8:
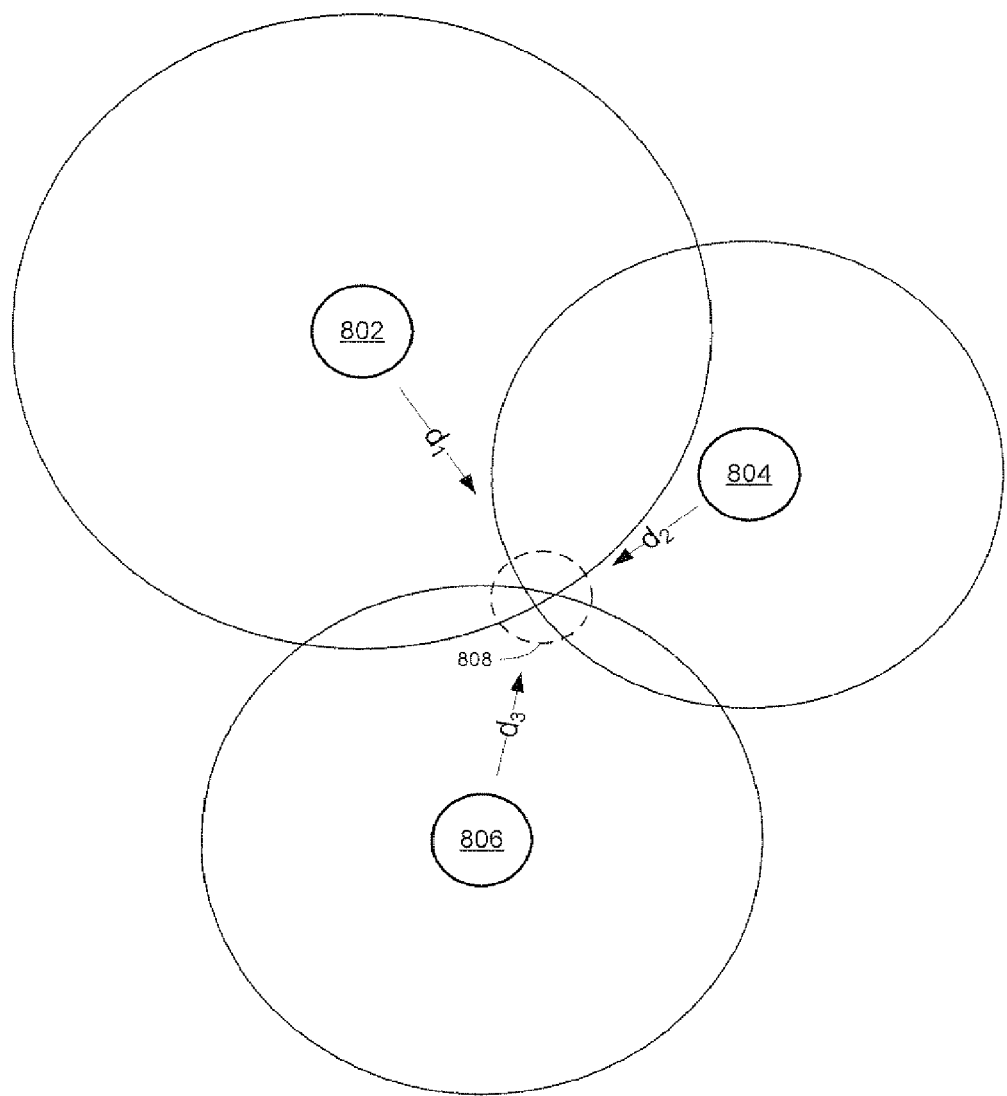
FIG. 8 is an illustration of the process of triangulating the position of a wireless access point (WAP)

FIG. 8 is an illustration of the process of triangulating (in 2D) the position of a wireless access point (WAP). This is one of the possible methods for estimating the position of the WAP. In FIG. 8 three scanning sites 802, 804, 806 are shown, each detecting a signal from a WAP in the approximate region 808. The WAP/region 808 is at a distance $d_1$, $d_2$, $d_3$ from respective scanning sites 802, 804, 806. Each site 802, 804, 806 is surrounded by a circle representing the locus of all points at distance $d_n$.

Here, $d_1$, $d_2$, $d_3$ are derived from any of the available distance measurement models described earlier and are used together with location co-ordinates of sites 802, 804, 806 in the following equation:

$$d_i = \sqrt{(x_r - x_{si})^2 + (y_r - y_{si})^2} \qquad (6)$$

Where $d_i$ is the distance, $x_r$ and $y_r$ are the x and y co-ordinates of WAP 7 and $x_{si}$ and $y_{si}$ are the x and y co-ordinates of places, where i is 1, 2, . . . , n. Three equations are formed and solved for x and y co-ordinates of the WAP in region 808. These equations can be solved with any available methods such as the least squares method.

As shown in FIG. 8, the mapped co-ordinates for the WAP in region 808 are where the three circles (the loci of the estimated distances between the sites and the WAP) overlap.

The circles do not overlap at a single point because of errors in the measurement/estimation of the distances $d_1$, $d_2$, $d_3$ and possible errors in the reference (or estimated) co-ordinates of the scanning sites 802, 804, 806.

It will be appreciated that the above 2D example can be extended into 3 dimensions as required. It is not normally required to record the three-dimensional position of a WAP (merely the two-dimensional position) but it will be appreciated that the relevant modifications can be made if a 3D location is required.

Figure 9:
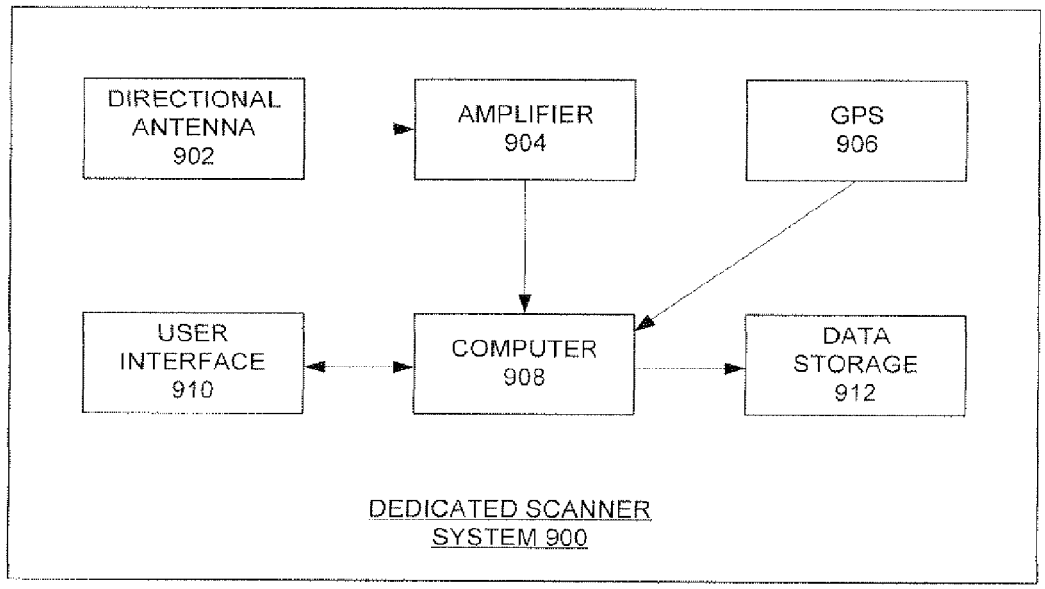
FIG. 9 is a schematic illustration of a dedicated scanner system suitable for use with the first phase at least of the process of FIG. 2.

FIG. 9 is a schematic Illustration of a dedicated scanner system suitable for use with the first phase at least of the process of FIG. 2. This scanner may be used in some or all of the embodiments described above in preference to a handheld unit (which may or may not be the same unit as the unit described below in relation to FIG. 10).

In FIG. 9 the dedicated scanner system (such as a wardriving rig) includes a directional antenna 902 (such as a direction Wi-Fi antenna), amplifier 904 for amplifying signals from the antenna, a GPS (or AGPS or other similar unit) 906 for providing reference coordinates of the scanner system 900, a computer 908 for controlling and/or processing and/or receiving data from any or all of the antenna 902, amplifier 904, GPS unit 906, a user interface 910 for controlling the scanner system, inputting relevant data and displaying results, and a data storage unit 912 for storing records created by the scanning process. In an alternative embodiment a network interface unit (not shown) is provided to allow data to be sent and/or received via a communications network, for example to allow remote control and/or data collection, which may obviate the need for the storage unit 912 for example.

Figure 10:
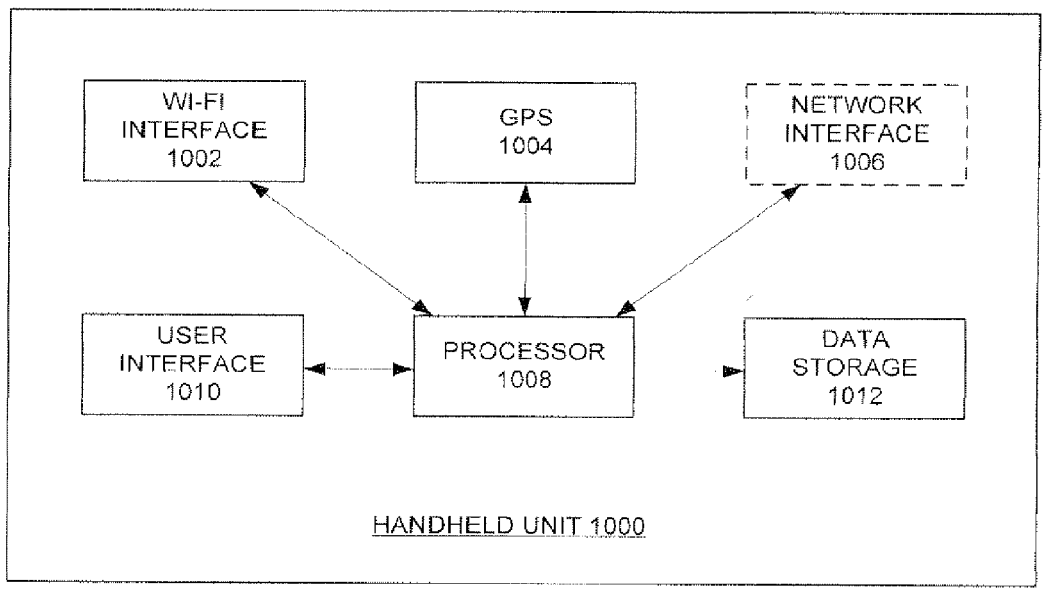
FIG. 10 is a schematic illustration of a handheld unit suitable for use with the first and second phases of the process of FIG. 2.

FIG. 10 is a schematic illustration of a handheld unit suitable for use with the first and second phases of the process of FIG. 2.

The handheld unit includes a Wi-Fi Interface 1002, a GPS or AGPS unit 1004, a network interface 1006 (which may optionally not be present for a purely local operation of the scanner), a processor (or microcontroller or other computerised device) 1008, a user interface 1010 and a data storage unit 1012. This unit may have less selectivity, signal amplification and/or processing power or storage capacity compared to the device described above in relation to FIG. 9, but may on the other hand be more portable and therefore easier to bring into closer contact with any WAPs that require scanning. In a further embodiment the handheld unit may omit or deactivate the GPS/AGPS unit 1004, for example if used only during the second phase of scanning.

In a further embodiment a scanner unit may be provided which mixes features from both the scanner system 900 described above in relation to FIG. 9 and the handheld unit 1000 described above in relation to FIG. 10.

Figure 11:
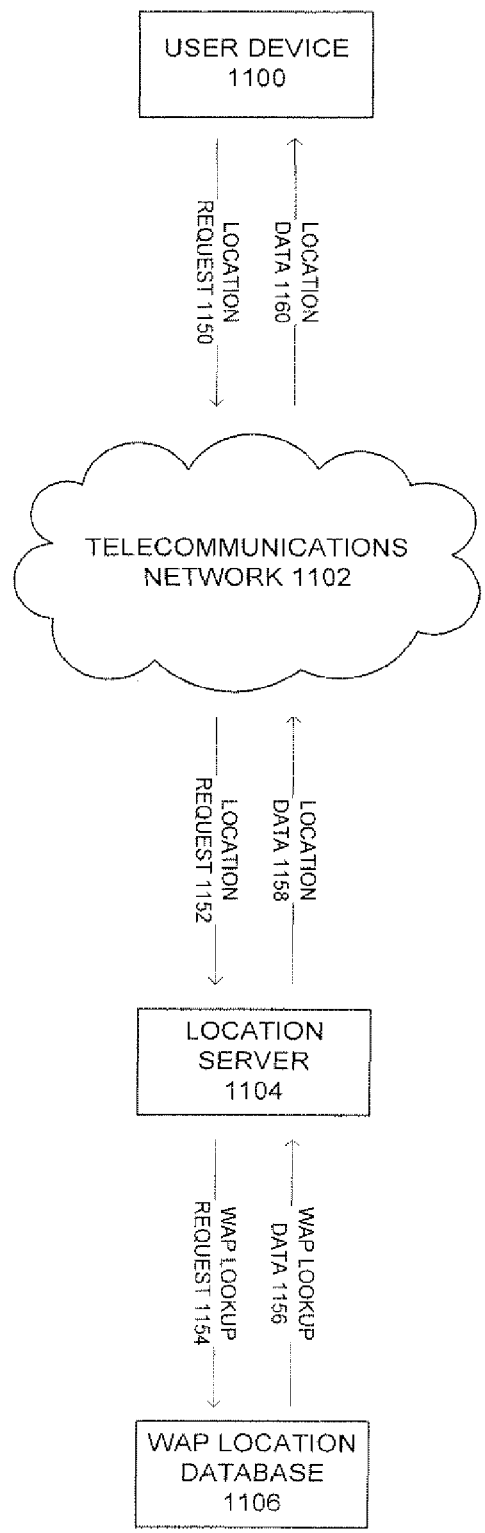
FIG. 11 is an overview of a system for locating a user device using the data generated by the process of FIG. 2.

FIG. 11 is an overview of a system for locating a user device using the data generated by the process of FIG. 2.

In FIG. 11 a user device 1100 (such as the handheld device 1000 described above or any other device, for example), a telecommunications network (such as a mobile telephone network) 1102, a location server 1104 and a WAP location database 1106 (which may be integrated with the location server 1104) are shown.

In use, a user causes the user device 110 to send a location request 1150 to the telecommunications network 1102 (for example using a service on a mobile telephone). The request 1150 may typically Include data received at the user device 1100, such as properties (such as those described above with regard to phases I and II above) of signals detected from nearby WAPs. The request 1150 may thus, for example, include details of the signal strengths of nearby WAPs and MAC addresses (and/or cell tower signals, and so on).

A request 1152 (usually the same as the initial request 1150) passes from the network 1102 to the location server 1104. The location server 1104 then processes the request 1152 and in so doing interrogates the location database 1106 with a WAP lookup request 1154, to specify WAP data that is relevant to the location request 1152. The database 1106 then returns the requested data 1156 to the server 1104. The server finishes processing the data 1156 in conjunction with the received request data 1152 to produce a location estimate which is sent back to the user device 1100 in the form of location data 1158. The network forwards location data 1160 (usually the same as the data 1158) to the user device 1100. The user device can then process the location data 1160 to retrieve (and for example display) the location estimate.

The system described above with reference to FIG. 11 may also be used in the initial 'discovery' phases, for example in conjunction with the phases I and II described above. The server 1104 may for example additionally or alternatively operate software to process the scanning data to produce the various estimates described above.

It will be appreciated that other applications of the position location system described above are of course possible, for example including location systems that are entirely local to a user device (for example including all relevant data and processing power in the user device), and devices that communicate via a variety of various different networks (not limited to one or to a telecommunications network, for example).

In summary, a method has been described of determining position co-ordinates of Wireless Access Points (WAPs) in Wireless Local Area Networks (WLANs) using a multiphase self correcting mapping process. The WAPs are typically Wi-Fi Access Points in respective WLANs, but they may be other WAPs of another Wi-Fi based position system. The method and system may be implemented fully on a consumer mobile device, for example, or may rely on remote components and software (such as a central server connected via some form of communications network, such as a WI-FI, mobile telephone or other network) to achieve the same aims.

Although the present invention has been described above with reference to specific embodiments, it will be apparent to a skilled person in the art that modifications lie within the spirit and scope of the present invention.

The invention claimed is:

1. A method of estimating the location of a plurality of electromagnetic signal sources, comprising:

scanning at a first plurality of locations to generate signal source position data, the signal source position data representing estimates of the position of one or more said signal sources;

scanning at a second plurality of locations using a signal detection system to generate signal detection data, the signal detection data relating to signals received at the second plurality of locations from the signal sources;

processing the signal source position data in dependence on the signal detection data to correct estimation errors in the signal source position data;

receiving location information data representing information about the second plurality of locations, and wherein processing the signal source position data comprises using the location information data to estimate the position of the second plurality of locations; and outputting the processed signal source position data.

2. A method according to claim 1, wherein processing the signal source position data further comprises using the signal detection data to estimate the position of the second plurality of locations.

3. A method according to claim 1, wherein the location information data comprises a user estimate of the position of at least one of said second plurality of locations.

4. A method according to claim 3, further comprising inputting the location information data via a user input device.

5. A method according to claim 1, wherein processing the signal source position data further comprises processing the signal detection data in accordance with an environmental model representing environmental factors applying to the signal sources.

6. A method according to claim 5, further comprising receiving at least one of environmental model selection data representing a choice of environmental model and environmental model parameter data representing a choice of at least one parameter of the environmental model, and processing the signal detection data in accordance with said at least one of the environmental model selection data and the environmental model parameter data.

7. A method according to claim 6, further comprising inputting said at least one of environmental model selection data and environmental model parameter data via a user input device.

8. A method according to claim 1, wherein processing the signal source position data further comprises generating further signal source position data representing new estimates of the signal sources in dependence on the signal detection data.

9. A method according to claim 8, further comprising processing the signal source position data and the further signal source position data to determine an appropriate adjustment to the signal source position data.

10. A method according to claim 1, further comprising processing the signal detection data to estimate the location of additional signal sources that were not detected at the first plurality of locations, and adding additional signal source position data to the signal source position data.

11. A method according to claim 1, wherein scanning at the first plurality of locations comprises:
scanning at the first plurality of locations to generate initial signal detection data, the initial signal detection data relating to signals received at the first plurality of locations from the signal sources;
processing the initial signal detection data in dependence on first scanning position data, the first scanning position data representing the position of each of the first plurality of locations, in order to generate the position estimate data.

12. A method according to claim 11, wherein scanning at the first plurality of locations comprises using the signal detection system to generate the initial signal detection data.

13. A method according to claim 1, further comprising using a positioning system at each of the first plurality of locations to generate the first scanning position data.

14. A method according to claim 13, wherein the positioning system is generally more effective at the first plurality of locations than at the second plurality of locations.

15. A method according to claim 13, wherein the signal detection system is generally more effective at the second plurality of locations than at the first plurality of locations.

16. A method according to claim 1, further comprising scanning using a signal detection system at a further plurality of locations to generate further signal detection data, and further processing the signal source position data in dependence on the further signal detection data.

17. A method according to claim 1, further comprising processing the signal source position data to generate map data representing a map of the signal sources.

18. A method according to claim 1, wherein the signal source is a wireless access point, such as a base station in a wireless communications network.

19. A method according to claim 18, in which at least one of the signal detection data, the signal source position data and the processed signal source position data is transmitted via the wireless access point.

20. A method according to claim 1, wherein at least part of the scanning is carried out using a hand-held portable device.

21. A method according to claim 1, wherein at least part of the scanning is carried out using a vehicle-mounted portable device.

22. A method according to claim 1, wherein the scanning is carried out by a user travelling between a plurality of locations.

23. A method according to claim 1, wherein the plurality of electromagnetic signal sources are wireless access points or wireless beacons.

24. A method according to claim 1, wherein the electromagnetic signal sources are stationary.

25. A method according to claim 1, further comprising:
storing the processed signal source position data;
receiving a user location request from a user device, the user location request including data obtained from a signal detection system associated with the user device;
processing the stored signal source position data in dependence on the user location request data to generate user location data representing an estimate of the location of the user device; and
outputting the user location data.

26. A non-transitory computer readable medium tangibly embodying computer program code for causing a computer to carry out a method as claimed in claim 1.

27. A portable unit programmed with computer program code for causing the portable unit to carry out a method as claimed in claim 1.

28. A method of estimating the location of a plurality of electromagnetic signal sources, comprising:
scanning at a first plurality of locations to generate signal source position data, the signal source position data representing estimates of the position of one or more said signal sources;
scanning at a second plurality of locations using a signal detection system to generate signal detection data, the signal detection data relating to signals received at the second plurality of locations from the signal sources;
processing the signal source position data in dependence on the signal detection data to correct estimation error in the signal source position data; wherein processing the signal source position data comprises processing the signal detection data in accordance with an environmental model representing environmental factors applying to the signal sources;
receiving at least one of environmental model selection data representing a choice of environmental model and environmental model parameter data representing a choice of at least one parameter of the environmental model, and processing the signal detection data in accordance with said at least one of the environmental model selection data and the environmental model parameter data; and
outputting the processed signal source position data.

29. A method according to claim 28, further comprising inputting said at least one of environmental model selection data and environmental model parameter data via a user input device.

30. A method of estimating the location of a plurality of electromagnetic signal sources, comprising:
scanning at a first plurality of locations to generate signal source position data, the signal source position data representing estimates of the position of one or more said signal sources;
scanning at a second plurality of locations using a signal detection system to generate signal detection data, the signal detection data relating to signals received at the second plurality of locations from the signal sources;
processing the signal source position data in dependence on the signal detection data to correct estimation errors in the signal source position data;
storing the processed signal source position data;
receiving a user location request from a user device, the user location request including data obtained from a signal detection system associated with the user device;
processing the stored signal source position data in dependence on the user location request data to generate user location data representing an estimate of the location of the user device; and
outputting the user location data.

31. A method according to claim 30, wherein processing the signal source position data further comprises using the signal detection data to estimate the position of the second plurality of locations.

32. A method according to claim 30, further comprising receiving location information data representing information about the second plurality of locations, and wherein processing the signal source position data further comprises using the location information data to estimate the position of the second plurality of locations.

33. A method according to claim 32, wherein the location information data comprises a user estimate of the position of at least one of said second plurality of locations.

34. A method according to claim 33, further comprising inputting the location information data via a user input device.

35. A method according to claim 30, wherein processing the signal source position data further comprises processing the signal detection data in accordance with an environmental model representing environmental factors applying to the signal sources.

36. A method according to claim 35, further comprising receiving at least one of environmental model selection data representing a choice of environmental model and environmental model parameter data representing a choice of at least one parameter of the environmental model, and processing the signal detection data in accordance with said at least one of the environmental model selection data and the environmental model parameter data.

37. A method according to claim 36, further comprising inputting said at least one of environmental model selection data and environmental model parameter data via a user input device.

38. A method according to claim 30, wherein processing the signal source position data further comprises generating further signal source position data representing new estimates of the signal sources in dependence on the signal detection data.

39. A method according to claim 38, further comprising processing the signal source position data and the further signal source position data to determine an appropriate adjustment to the signal source position data.

40. A method according to claim 30, further comprising processing the signal detection data to estimate the location of additional signal sources that were not detected at the first plurality of locations, and adding additional signal source position data to the signal source position data.

41. A method according to claim 30, wherein scanning at the first plurality of locations comprises:
scanning at the first plurality of locations to generate initial signal detection data, the initial signal detection data relating to signals received at the first plurality of locations from the signal sources;
processing the initial signal detection data in dependence on first scanning position data, the first scanning position data representing the position of each of the first plurality of locations, in order to generate the position estimate data.

42. A method according to claim 41, wherein scanning at the first plurality of locations comprises using the signal detection system to generate the initial signal detection data.

43. A method according to claim 30, further comprising using a positioning system at each of the first plurality of locations to generate the first scanning position data.

44. A method according to claim 43, wherein the positioning system is generally more effective at the first plurality of locations than at the second plurality of locations.

45. A method according to claim 43, wherein the signal detection system is generally more effective at the second plurality of locations than at the first plurality of locations.

46. A method according to claim 30, further comprising scanning using a signal detection system at a further plurality of locations to generate further signal detection data, and further processing the signal source position data in dependence on the further signal detection data.

47. A method according to claim 30, further comprising processing the signal source position data to generate map data representing a map of the signal sources.

48. A method according to claim 30, wherein the signal source is a wireless access point, such as a base station in a wireless communications network.

49. A method according to claim 48, in which at least one of the signal detection data, the signal source position data and the processed signal source position data is transmitted via the wireless access point.

50. A method according to claim 30, wherein at least part of the scanning is carried out using a hand-held portable device.

51. A method according to claim 30, wherein at least part of the scanning is carried out using a vehicle-mounted portable device.

52. A method according to claim 30, further comprising:
storing the processed signal source position data;
receiving a user location request from a user device, the user location request including data obtained from a signal detection system associated with the user device;
processing the stored signal source position data in dependence on the user location request data to generate user location data representing an estimate of the location of the user device; and
outputting the user location data.

53. A method according to claim 30, wherein the scanning is carried out by a user travelling between a plurality of locations.

54. A non-transitory computer readable medium tangibly embodying computer program code for causing a computer to carry out a method as claimed in claim 30.

55. A portable unit programmed with computer program code for causing the portable unit to carry out a method as claimed in claim 30.

56. A method according to claim 30, wherein the plurality of electromagnetic signal sources are wireless access points or wireless beacons.

57. A method according to claim 30, wherein the electromagnetic signal sources are stationary.

* * * * *